(No Model.)
E. A. WALTZ.
END GATE FOR WAGONS.
No. 400,022. Patented Mar. 19, 1889.
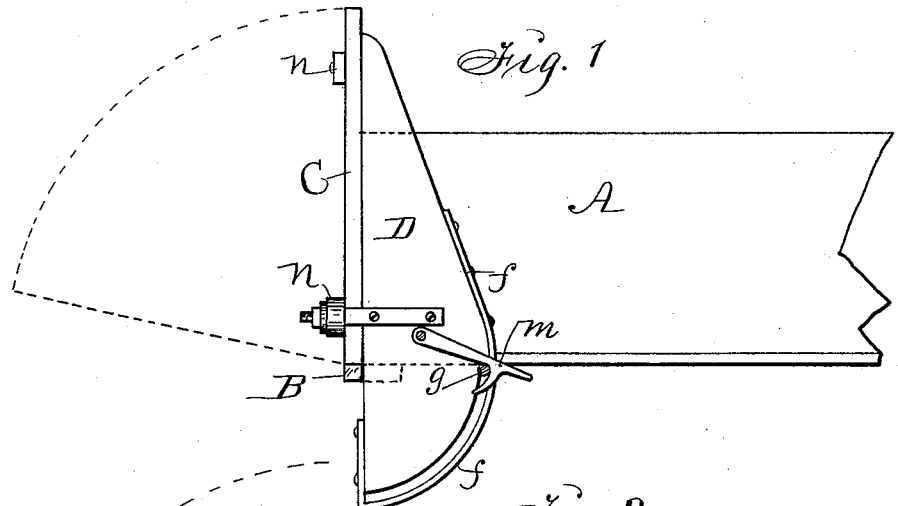
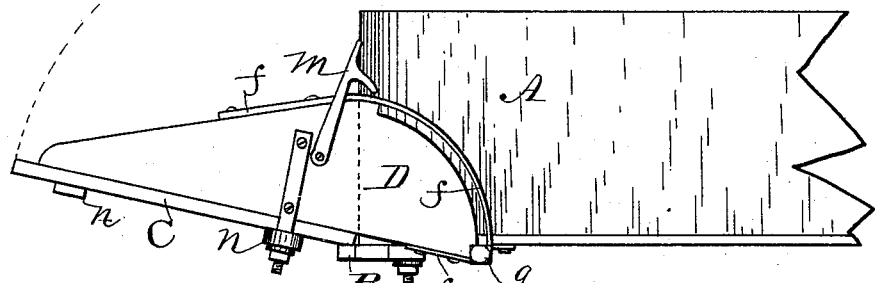
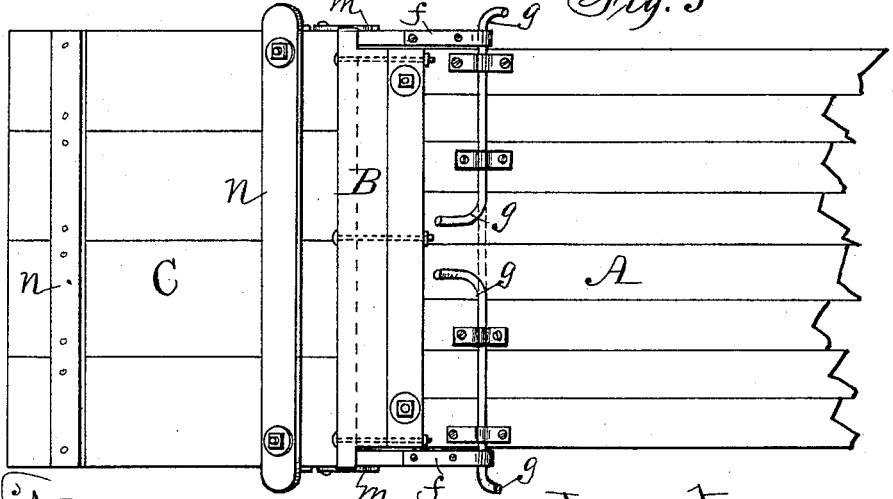
Witnesses:
M. P. Smith,
C. M. Stiles.
Inventor:
Earnest A. Waltz,
By Thomas G. Orwig, Atty.

UNITED STATES PATENT OFFICE.

EARNEST A. WALTZ, OF VALLERIA, IOWA.

END-GATE FOR WAGONS.

SPECIFICATION forming part of Letters Patent No. 400,022, dated March 19, 1889.

Application filed December 27, 1888. Serial No. 294,823. (No model.)

*To all whom it may concern:*

Be it known that I, EARNEST A. WALTZ, a citizen of the United States of America, and a resident of Valleria, in the county of Jasper and State of Iowa, have invented an Improved End-Gate for Wagons, of which the following is a specification.

My improvement relates to that class of end-gates that are adjustably connected with a wagon-box, so they can be used as shoveling-boards; and my object is to facilitate attaching, adjusting, locking, and detaching the end-gate; and I accomplish the results contemplated, as hereinafter set forth, pointed out in my claims, and illustrated in the accompanying drawings, in which—

Figure 1 is a side view of the rear portion of a wagon to which my end-gate is applied and shown in a closed and locked position. Fig. 2 is a corresponding view showing the end-gate in position as required to be used as a shoveling-board. Fig. 3 is a bottom view of the box and the end-gate when in position, as shown in Fig. 2.

A represents a wagon-box of common form.

B is a cross-piece fixed to the rear end and under side of the bottom of the box in such a manner that it will project rearward to serve as a support for the bottom of the end-gate.

C is the end-gate and D are wings fixed on its ends to project forward to overlap the sides of the wagon-box in a common way. The large and lower ends of the wings are curved, and metal bands or straps $f$ are fixed around them in such a manner as to produce curved slots or bearings through which a rod or bolts can be extended to hinge the end-gate to the box.

$g\ g$ are sliding bolts attached to the bottom of the box A by means of fixed bearings $h$ in such a manner that they can be drawn inward and out of the curved slots, as required, to free the end-gate so it can be detached from the box whenever desired. The ends of the sliding bolts are bent in opposite directions. Their inner ends will in their normal condition project downward and by force of gravity retain their outer ends in a horizontal position, as required, to project forward across the metal straps $f$, as shown in Fig. 3.

In place of using two sliding bolts, a single rod having a head on one end, as shown in Fig. 2, may be passed through the bearings $h$ and a nut put on its screw-threaded end in a common way to detachably hinge the end-gate to the box.

$m$ are hooks pivoted to the wings D to engage the sliding bolts, as shown in Figs. 1 and 3, and, as required, to lock the gate in a closed position.

$n$ are cleats fixed to the outside of the gate A by means of irons $r$ or in any suitable way, to aid in securing the wings and strengthening the complete end-gate.

It is obvious that my end-gate can be readily attached and detached at pleasure, readily closed and locked, and also readily unlocked and adjusted, as required, to be used for a shoveling-board, and therefore applied advantageously to farm-wagons, new or old.

I claim as my invention—

1. An end-gate for wagons, having wings projecting forward from its ends and circular slots or bearings at the lower ends of the wings, and hooks pivoted to the outside of said wings, in combination with a wagon-box having a cross-piece at its rear end and bottom to support the end-gate, and a rod or sliding bolts attached to its bottom and extended through the curved slots or bearings in the wings of the end-board, to operate substantially as set forth, for the purposes stated.

2. An end-gate, C, having wings D, provided with curved slots or bearings by means of strap-irons $f$, in combination with a wagon-box, A, having a fixed cross-piece, B, and sliding bolts $g$, and hooks $m$, pivoted to the said wings to engage the said bolts, substantially as shown and described, for the purposes stated.

EARNEST A. WALTZ.

Witnesses:
JOHN F. O'BRIEN,
JONATHAN BLYLER.